United States Patent Office 2,951,758

Patented Sept. 6, 1960

2,951,758

PHOTOPOLYMERIZABLE COMPOSITIONS AND ELEMENTS

Norman Thomas Notley, Highland Park, N.J., assignor to E. I. du Pont de Nemours and Company, Wilmington, Del., a corporation of Delaware No Drawing. Filed May 17, 1957, Ser. No. 659,772

22 Claims. (Cl. 96—35)

This invention relates to photopolymerizable compositions and elements. More particularly it relates to such compositions and elements which contain polynuclear quinones as addition polymerization initiators. The invention also relates to a process of making printing reliefs from such elements.

An object of this invention is to provide new and useful addition photopolymerizable compositions. Another object is to provide such compositions which are inactive thermally at elevated temperatures and do not undergo addition polymerization during the preparation of a photopolymerizable element. A further object is to provide such compositions which contain addition polymerization initiators activatable by actinic light and a mono- or diester of a glycol containing at least one ether-oxygen bonded solely to carbon or a monoalkyl ether or monoacyl ester thereof with an acrylic or α-alkylacrylic acid. A still further object is to prepare such compositions which in the form of thin layers can be photopolymerized to an insoluble product in a short period of time. Still other objects will be apparent from the following description of the invention.

Various compounds have been used to initiate the addition photopolymerization of acrylic or methacrylic acid esters of diethylene glycol or triethylene glycol and higher polyalkylene glycols. Of these, benzoin and benzoin methyl ether have been found to be the most practical commercially. It has been found, however, when such compositions are made and processed into sheets or layers by milling, calendering, or extruding operations at elevated temperatures, e.g., 120–170° C., that at these temperatures some addition polymerization takes place.

It has been found that the foregoing objectionable thermal addition polymerization of such compositions can be overcome, if polymerization-effective amounts of polynuclear quinones are used as the light-activated addition polymerization initiators.

The polynuclear quinones which have been found to be useful in the photopolymerizable compositions and elements of the invention have a carbocyclic ring and two intracyclic carbonyl groups in such ring attached to intracyclic carbon atoms in a conjugated ring and have at least one aromatic carbocyclic ring fused to the ring containing the carbonyl groups. The polynuclear quinones may be unsubstituted or may have one or more of the hydrogen atoms substituted with an alkyl, aryl or aralkyl group, a halogen, e.g., chlorine, or a carboxylic acid or sulfonic acid group or an alkali metal or ammonium salt of such groups.

Suitable alkyl groups which may be present include methyl, ethyl, tert-butyl, propyl, isopropyl. Alkyl groups on adjacent carbon atoms in the ring structure may be joined to form, with the said adjacent carbon atoms, a ring of five to seven carbon atoms. Suitable aryl radicals include phenyl, naphthyl, biphenyl, and suitable aralkyl radicals include benzyl, α-phenethyl, and menaphthyl. Substitution by aromatic nitro, amino, and hydroxyl groups is not desirable because these groups, being inhibitory in nature, tend to reduce the usefulness of the polynuclear quinones of the invention. Among the polynuclear quinones which can be used in the photopolymerizable compositions of the invention are 9,10-anthraquinone, 1-chloroanthraquinone, 2-chloroanthraquinone, 2-methylanthraquinone, 2-tert-butylanthraquinone, octamethylanthraquinone, 1,4-naphthoquinone, 9,10-phenanthrenequinone, 1,2-benzanthraquinone, 2,3-benzanthraquinone, 2-methyl-1,4-naphthoquinone, 2,3-dichloronaphthoquinone, 1,4-dimethylanthraquinone, 2,3-dimethylanthraquinone, 2-phenylanthraquinone, 2,3-diphenylanthraquinone, sodium salt of anthraquinone α-sulfonic acid, 3-chloro-2-methylanthraquinone, retenequinone, 7,8,9,10-tetrahydronaphthacenequinone, 1,2,3,4-tetrahydrobenz[a]anthracene-7,12-dione.

The photopolymerizable compositions of this invention can be made by admixing (*a*) an ester of acrylic acid or an α-alkylacrylic acid, where the alkyl group is methyl, ethyl, butyl, n-propyl or isopropyl, and a glycol containing at least one ether-oxygen bonded solely to carbon, or a monoalkyl ether or saturated monoacyl ester thereof, (*b*) the polynuclear quinone initiator and (*c*) any additional materials as desired, e.g., other ethylenically unsaturated monomers, compatible filler materials, addition polymerization inhibitors, pigments or dyes.

The compositions can be thoroughly mixed by the aid of any conventional mixing or milling apparatus for plastic materials and formed into a sheet, or layer on a suitable support, by milling and pressing at elevated temperatures, for instance at temperatures up to 150° C. for periods up to 20 minutes.

The photopolymerizable elements of this invention comprise a support, e.g., sheet or plate and a photopolymerizable layer of the above-described composition, preferably 3 to 250 mils in thickness, and the relief-height-forming stratum should be essentially non-light-scattering.

Suitable base or support materials include metals, e.g., steel and aluminum plates, sheets and foils, and films or plates composed of various film-forming synthetic resins or high polymers, such as the addition polymers, including those mentioned later, for use in the photopolymerizable layer and in particular the vinylidene polymers, e.g., the vinyl chloride polymers, vinylidene chloride copolymers with vinyl chloride, vinyl acetate, or acrylonitrile; and vinyl chloride copolymers with the latter three monomers; linear condensation polymers such as polyesters, e.g., polyethylene terephthalate; polyamides, e.g., polyhexamethylenesebacamide; polyester amides, e.g., polyhexamethyleneadipamide/adipate; etc. Fillers or reinforcing agents can be present in the synthetic resin or polymer bases. Suitable agents include various fibers (synthetic, modified or natural), e.g., cellulosic fibers, for instance, cotton, cellulose acetate, viscose rayon, paper; glass wool; nylon, and the like. These reinforced bases may be used in laminated form. The adherent support for the photopolymerizable layer can be a supporting sheet of the photopolymerizable composition.

When highly reflective bases and particularly metal base plates are used, any oblique rays passing through clear areas in the image-bearing transparency will strike the surface of the base at an angle other than 90° and after resultant reflection will cause polymerization in non-image areas. The degree of unsharpness in the relief progressively increases as the thickness of the desired relief and the duration of the exposure increases. It has been found that this disadvantage can be overcome in carrying out the invention when the photopolymerizable composition is deposited on a base which reflects more than 35% of the incident actinic light, by having an intervening stratum sufficiently absorptive of actinic light so that less than 35% of the incident actinic light is reflected. This light-absorptive stratum must be adherent to both the photopolymerized image and the base material. The photopolymerizable layer itself can serve as the light-absorptive layer when dyes or pigments are included in the composition.

The light-absorptive layer can be formed directly on the surface of the light-reflective base, for instance, by dyeing in the case of anodized aluminum plates, by "blueing" or chemical blackening such as is obtained with molten dichromate baths in the case of iron or steel plates. In these instances, a separate resin anchor layer adherent to the colored base and the photopolymerizable layer is applied. A practical method of supplying the layer absorptive of reflected light, or nonhalation layer, is to disperse a finely divided dye or pigment, which substantially absorbs actinic light, in a solution or aqueous dispersion of a resin or polymer which is adherent to both the support and the photopolymerizable layer and coating it on the support to form an anchor layer which is dried.

Printing reliefs can be made in accordance with this invention by exposing to actinic light selected portions of a photopolymerizable layer of an element described above, e.g., through an image-bearing transparency or stencil having areas essentially transparent to actinic light and of substantially uniform optical density and areas opaque to actinic light and of substantially uniform optical density, until addition polymerization to the desired depth is essentially complete, i.e., to the insoluble state, in the exposed portions or areas with no significant polymerization in the unexposed portions or areas, and removing the unexposed portions of the layer, e.g., by solvent treatment. Removal can be expedited by brushing or spraying with a solvent for the unpolymerized material.

The invention is further illustrated by, but is not limited to, the following examples wherein the parts and percentages are by weight and the photopolymerizable compositions and elements are made under such conditions that they are not exposed significantly to actinic light.

*Example I*

A solution of 0.15% of anthaquinone in triethylene glycol diacrylate in a test tube from which oxygen had been removed by flushing with nitrogen was exposed to light from a 500-watt tungsten filament incandescent lamp at a distance of ten inches from the tube. Polymerization was essentially complete in three seconds' exposure. With the best of previously known sensitizers, benzoin methyl ether, essentially complete polymerization under identical conditions required 9 seconds.

*Example II*

A solution of triethylene glycol diacrylate containing 0.15% of anthaquinone was exposed in a test tube, from which oxygen had been removed by flushing with nitrogen, to the radiation from a 500-watt photoflood lamp at a distance of 18 inches from the tube. Polymerization was complete in six seconds. Similar polymerization with no initiator requires several hours, and with 1% of benzoin, required approximately 4 minutes.

*Example III*

To 5 ml. portions of methoxytriethylene glycol acrylate (containing 0.1% of 2,6-di-tert-butyl p-cresol as thermal inhibitor) in test tubes were added (*a*) 1.0% benzoin methyl ether and (*b*) 0.1% anthaquinone. After the oxygen had been removed from the test tube by flushing with nitrogen, the contents were exposed to the collimated beam of light from a 100-watt mercury-vapor arc lamp. The methoxytriethylene glycol acrylate containing the benzoin methyl ether gelled (polymerized) in 92 seconds, whereas that containing the anthaquinone gelled in 68 seconds.

*Example IV*

Triethylene glycol diacrylate (containing 0.1% of 2,6-di-tert-butyl p-cresol as inhibitor) in the amount of 40 parts and containing 0.15% anthraquinone dissolved therein was intimately mixed with 60 parts by weight of cellulose acetate by milling for 12 minutes at 110° C. The milled material was pressed in a laminating press between heated platens (145°) separated by 48-mil spacers. The clear, pressed sheet was laminated by a non-reflective adhesive layer to a sheet of aluminum 100 mils thick. The resultant plate, bearing a clear, approximately 40-mil layer of cellulose acetate, triethylene glycol diacrylate, anthraquinone and di-tert-butyl p-cresol, was placed in a vacuum frame, and the surface of the photopolymerizable layer was brought into contact with a line process negative. The photopolymerizable layer in the vacuum frame was exposed through the negative to light from a 2000-watt high-pressure mercury arc lamp placed about 18 inches above said frame for 3 minutes. After exposure, the negative was stripped from the plate and the unexposed polymer in the layer was removed by washing with acetone. The resulting relief image, which was firmly bonded to the aluminum, was used as a printing plate. Plates containing 1.5% benzoin, based on thiethylene glycol diacrylate, rather than anthaquinone as an initiator required exposures of 8 minutes to effect polymerization and form a similar relief.

*Example V*

A composition similar to that of Example IV containing 60 parts of cellulose acetate hydrogen succinate instead of cellulose acetate was prepared and processed as in that example, except that the washing solution was water containing 1% ammonia. As in Example IV, a relief image of excellent quality, which was used as a printing plate, was obtained after an exposure time of only 3 minutes as against the 8 minutes required when 1% benzoin was used as an initiator. Furthermore, the composition containing benzoin was extremely difficult to fabricate because of its tendency to polymerize during milling at 110° C.

*Example VI*

An anthraquinone-containing composition similar to that of Example IV was prepared and processed as in that example, except that instead of the predominantly ultraviolet light from the 2000-watt high-pressure mercury-vapor arc lamp, light from a 500-watt photoflood lamp at a distance of 6 inches was used. The time required for polymerization to form a printing relief was 6 minutes.

*Example VII*

Example VI was repeated with the anthraquinone-containing composition of Example V. An exposure of 6 minutes was sufficient in this case also to form a printing relief.

*Example VIII*

When 0.1% by weight, based on triethylene glycol diacrylate, of mucochloric acid was added to the composition of Example IV, containing 0.1% anthraquinone, a still further reduction in exposure time was noted in that less than 2 minutes was required. Furthermore, when mucochloric acid was added to the composition, milling and pressing time could be extended to thirty minutes at 150° C.

*Example IX*

When 0.1% solutions of the following quinones in triethylene glycol diacrylate were exposed in test tubes, from which oxygen had been removed by flushing with nitrogen, to the radiation from a 500-watt photoflood lamp at a distance of 18 inches, polymerizations were effected in the times given below:

| | Sec. |
|---|---|
| Benzoquinone | 50 |
| Anthraquinone | 8 |
| 2-chloroanthraquinone | 7 |
| 1-chloroanthraquinone | 6 |

*Example X*

When pure methoxytriethylene glycol acrylate in a test tube from which the oxygen had been removed by flushing with nitrogen was exposed to light from a 100-watt mercury-vapor arc lamp, gelation took place after 720 seconds. When 1% of benzoquinone was added, gelation required 3700 seconds, i.e., the mononuclear quinone acted in this instance as an inhibitor. When, on the other hand, 0.1% of anthraquinone was added to the pure methoxytriethylene glycol acrylate, gelation occurred in 22 seconds.

*Example XI*

Solutions of triethylene glycol diacrylate containing 0.01% of each of the following quinones were exposed in test tubes from which the oxygen had been removed by flushing with nitrogen, to the light from a 100-watt mercury-vapor arc lamp. Gelation occurred in the times tabulated below:

| | Sec. |
|---|---|
| No initiator | 190 |
| Camphorquinone | 45 |
| Benzoquinone | 24 |
| Sodium salt of anthraquinone α-sulfonic acid | 9 |
| 1,4-naphthoquinone | 3.5 |
| Retenequinone | 2.5 |
| 9,10-anthraquinone | 2.2 |
| 2-methylanthraquinone | 2.1 |
| 7,8,9,10-tetrahydronaphthacenequinone | 1.1 |

*Example XII*

When 0.1% solutions of anthraquinone in 5 cc. of each of the following glycol dimethacrylates were exposed, in test tubes flushed with nitrogen to remove oxygen, to light from a 100-watt mercury-vapor arc lamp and compared with similar exposure of the dimethacrylates without anthraquinone, the following results were obtained:

| Monomer | Time of Polymerization | |
|---|---|---|
| | Anthraquinone Present, sec. | Anthraquinone Absent, sec. |
| Ethylene glycol dimethacrylate | 2,100 | >6,000 |
| Diethylene glycol dimethacrylate | 35 | 170 |
| Triethylene glycol dimethacrylate | 63 | 1,900 |

*Example XIII*

When samples of triethylene glycol diacrylate were subjected to temperatures of 140° C. without initiators and with benzoin, benzoin methyl ether, and anthraquinone as initiators in the absence of air and in the presence of a thermal inhibitor, 0.2% of di-tert-butyl p-cresol, it was found, as the following table shows, that, whereas the presence of the previously used initiators, benzoin and benzoin methyl ether, appreciably diminished the thermal stability of the triethylene glycol diacrylate, the presence of 1/10 as much anthraquinone greatly increased the thermal stability:

| Initiator (Percent by Weight) | Thermal Stability at 140° C. of Triethylene Glycol Diacrylate (Time in Seconds before Occurrence of Polymerization) |
|---|---|
| None | 550 |
| 1% Benzoin | 52 |
| 1% Benzoin methyl ether | 114 |
| 0.1% Anthraquinone | 2,000 |

In place of the specific polyalkylene glycol acrylates and methacrylates of the foregoing examples, there may be substituted in similar amounts other such compounds, e.g., diethylene glycol diacrylate, methoxytriethylene glycol methacrylate, di- and triethylene glycol acrylates and methacrylates, the acrylates, diacrylates, methacrylates, and dimethacrylates of tetraethylene glycol, dipropylene glycol, and polybutylene glycols. Still other useful compounds include the diacrylates and dimethacrylates of ether-glycols which also contain a combined intrachain dibasic acid unit, e.g., the diacrylate or dimethacrylate of $$HOCH_2CH_2OCH_2CH_2OOCRCOOCH_2CH_2OCH_2CH_2OH$$

where R is a divalent hydrocarbon radical, e.g., methylene or ethylene.

Since some polynuclear quinones are highly colored materials, a choice among the applicable polynuclear quinones will be made depending on the use to which the photopolymerizable compositions are to be put. Ordinarily, the color is of no moment in the very small concentrations which are effective in initiating polymerizations, and in thin layers of polymerizable compositions the color does not affect light transmission. However, when the compositions are to be used as intermediate layers in safety glass compositions, for example, or as transparent sheets for optical or photographic purposes, quinones giving a yellowish or other tint in the concentrations necessary for photopolymerization will be avoided. On the other hand, when the compositions are to be used in the preparation of photopolymerizable printing plates, where the color of the final product is of little significance, the choice of the quinone will depend on its efficiency.

When polyalkylene glycol acrylates and methacrylates are used for the preparation of printing plates by the photopolymerization methods of U.S. 2,760,863, Plambeck, various binder materials or fillers may be present, such as are disclosed in that patent and in assignee's Saner U.S. application, Ser. No. 577,829, filed April 12, 1956, Solvent-Soluble Polyamides; Martin, Ser. No. 538,277, filed October 3, 1955 (U.S. Patent 2,892,716, June 30, 1959), and Ser. No. 461,291, filed October 8, 1954, Polyvinyl Acetals; Martin and Barney, Ser. No. 596,766, filed July 9, 1956 (U.S. Patent 2,927,022, March 1, 1960), Cellulose Acetate Hydrogen Dicarboxylate Esters; Martin, Ser. No. 604,006, filed August 14, 1956 (U.S. Patent 2,902,365, September 1, 1959), Base-Soluble Polyvinyl Alcohol Derivatives; Martin, Ser. No. 606,505, filed August 27, 1956 (U.S. Patent 2,927,023, March 1, 1960), Water-Soluble Polyvinyl Alcohol Derivatives; Martin, Ser. No. 606,517, filed August 27, 1956, abandoned January 18, 1960, Water-Soluble Cellulose Derivatives. Binder materials which are compatible with the particular acrylate or methacrylate will be chosen, of course. By compatibility is meant the ability of two or more constituents to remain homogeneously dispersed in one another. Some haze of the composition before or during exposure can be tolerated but in the case of fine detail is preferably avoided.

The preferred catalysts or initiators of the present invention are most useful in concentrations which usually lie near the upper limit of their solubility. For example, the solubility of anthraquinone in triethylene glycol diacrylate is about 0.2% by weight. Some other quinones are more soluble in the compositions in question, but amounts greater than about 2% by weight do not usually lead to increased photo-response. The lower limit for effective utilization is about 0.001% by weight, based on the acrylate used. In the event that a combination of polynuclear quinones is used, the sum of their weights should be no less than 0.001% by weight on the basis of the acrylate used.

With the initiators and acrylate or methacrylate compositions here described, temperatures as high as 170° C. for as long as 5 minutes can be endured by the photopolymerizable compositions containing them, and temperatures of 150° C. for 20 minutes. The higher thermal stability of monomers containing the initiators of the present invention in comparison with those containing initiators of the prior art may be seen from the table in Example XIII.

As may be seen by a comparison of Examples I and III, polymerization with initiators of the present invention may be effected not only by exposure to ultraviolet light, as from the mercury-vapor arc lamp of Example III, but also by exposure to light sources giving predominantly visible radiation, as exemplified by the projection lamp of Example I. Thus, ordinary daylight of sufficient intensity would be adequate for photopolymerization of the compositions here described, but, in practice, it would not be desirable to have to depend on daylight alone for illumination. The duration of the exposure will, of course, depend upon the thickness and composition of the layer being exposed, but will, in any event, be briefer than for comparable thicknesses and compositions containing initiators of the prior art.

Most commercially available polymerizable monomers, including the acrylates and methacrylates, normally contain minor amounts (about 50–100 parts per million by weight) of polymerization inhibitors to prevent spontaneous polymerization before it is desired. The presence of these inhibitors, e.g., hydroquinone, tertiary butyl catechols, and the like, in such amounts causes substantially no undesirable results in the photopolymerizable compositions of this invention either as to speed or quality of polymerization.

Although the photopolymerizations of the present invention will take place in the presence of atmospheric oxygen, it has been found preferable to exclude air during the process of photopolymerization in that the process occurs with far greater rapidity in the absence of oxygen. When the photopolymerizable compositions are formed into sheets for the preparation of printing plates, exposure may be made in a vacuum frame.

The polynuclear quinone-initiated polyaklylene glycol acrylates and methacrylates of the present invention have many applications, either as such or in combination with other addition-polymerizable compositions of with various polymeric or other materials. For example, they can be used as photo-setting adhesives, as in the preparation of safety glass, for example, for the production of photo-crosslinked plastics and for the application of raised designs to surfaces. They are particularly well suited to the fabrication of photopolymerizable compositions for the production of printing plates as disclosed in Plambeck U.S. Patents 2,760,863 and 2,791,504. They may also be used in photopolymerizable compositions for affixing phosphors to surfaces to provide color television screens as disclosed in assignee Swindells application, Ser. No. 373,753, filed August 12, 1953, or to form indicia on instrument panels.

The polynuclear quinone-initiated polyalkylene glycol acrylates and methacrylates have numerous advantages because of their increased rate of light-initiated polymerization and their enhanced thermal stability. Moreover, when these compositions are used for the production of printing plates, the high rate of polymerization produces a superior image, for the mechanical hardness of the photopolymer image and its resistance to solvent during development are materially enhanced by increased speed of polymerization. In other words, printing characters of greater hardness, sharpness, and fidelity are made possible by the use of the initiators herein set forth.

As stated above, the thermal stability of the present compositions is of importance in the preparation of photopolymerizable plates for making printing reliefs as they may be prepared at elevated temperatures (120–170° C.) by milling, calendering, or extruding without the use of solvents. Milling and calendering may be readily accomplished because it is possible to keep the compositions at elevated temperatures for appreciable lengths of time. Also, the compositions can be safely extruded because the compositions can be maintained at relatively high temperatures in an extrusion hopper for a substantial period without the occurrence of thermal polymerization. With the catalysts of the prior art, on the other hand, milling and calendering become difficult because the material will polymerize thermally on the heated rolls, and hence will not form a sheet which can subsequently be selectively polymerized by exposure to light in a pattern. For the same reason, extrusion of photopolymerizable compositions containing catalysts of the prior art has been difficult, as will readily be appreciated by reference to the table in Example XIII where the comparative thermal stability at 140° C. of triethylene glycol diacrylate containing benzoin, benzoin methyl ether, and anthraquinone is recorded.

Not only is the thermal stability of these compositions useful in sheet fabrication, but it is of considerable importance where the storage of these materials is concerned. It has been found that storage at 120° F. (50° C.) for a period of several months has not caused premature polymerization. Still other advantages will be apparent to those skilled in the art.

What is claimed is:

1. A photopolymerizable composition comprising (1) an ethylenically unsaturated ester taken from the group consisting of acrylic acid and alpha-alkylacrylic acid mono- and diesters of polyglycols having at least one ether-oxygen bonded solely to carbon and having not more than four carbon atoms between ether oxygen groups and the acrylic and alpha-alkylacrylic acid monoesters of the monoalkyl ethers and monoalkanoic acid esters of said polyglycols, wherein said alpha-alkyl group contains 1 to 4 carbon atoms, and (2) from 0.001% to 2.0% by weight, based on said unsaturated ester, of a polynuclear quinone having two intracyclic carbonyl groups attached to intracyclic carbon atoms in a conjugated six-membered ring, there being at least one aromatic carbocyclic ring fused to the ring containing said carbonyl groups.

2. A composition as set forth in claim 1 wherein said initiator is present in an amount from 0.001% to 0.2% by weight in the composition.

3. A process as set forth in claim 1 wherein said polynuclear quinone is 9,10-phenanthrenequinone.

4. A composition as set forth in claim 1 wherein said polynuclear quinone is anthraquinone.

5. A composition as set forth in claim 1 wherein said polynuclear quinone is 2-methylanthraquinone.

6. A composition as set forth in claim 1 wherein said polynuclear quinone is 1,2,3,4-tetrahydrobenz[a]anthracene-7,12-dione.

7. A composition as set forth in claim 1 wherein said polynuclear quinone is 1-methyl-7-isopropyl-9,10-phenanthrenequinone.

8. A composition as set forth in claim 1 wherein said ester is triethylene glycol diacrylate.

9. A composition as set forth in claim 1 wherein said ester is triethylene glycol dimethacrylate.

10. A photopolymerizable composition as set forth in claim 1 containing a filler material.

11. A photopolymerizable composition as set forth in claim 10 wherein said filler material is a water-soluble cellulose acetate hydrogen dicarboxylic.

12. A photopolymerizable composition as set forth in claim 11 wherein said cellulose derivative is cellulose acetate hydrogen succinate.

13. A photopolymerizable element having a support and a photopolymerizable layer comprising (1) an ethylenically unsaturated ester taken from the group consisting of acrylic and alpha-alkylacrylic acid mono- and diesters of polyglycols having at least one ether-oxygen bonded solely to carbon and having not more than four carbon atoms between ether oxygen groups and the acrylic and alpha-alkylacrylic acid monoesters of the monoalkyl ethers and monoalkanoic acid esters of said polyglycols, wherein said alpha-alkyl group contains 1 to 4 carbon atoms, and (2) from 0.001% to 2.0% by weight, based on said unsaturated ester, of a polynuclear quinone having two intracyclic carbonyl groups attached to intracyclic carbon atoms in a conjugated six-membered ring, there being at least one aromatic carbocyclic ring fused to the ring containing said carbonyl groups.

14. An element as set forth in claim 13 having an antihalation material beneath said layer.

15. An element as set forth in claim 13 wherein said polynuclear quinone is anthraquinone.

16. An element as set forth in claim 13 wherein said ester is triethylene glycol diacrylate.

17. An element as set forth in claim 13 wherein said ester is triethylene glycol dimethacrylate.

18. An element as set forth in claim 13 wherein said layer contains as filler material a water-soluble cellulose acetate hydrogen dicarboxylate.

19. An element as set forth in claim 18 wherein said cellulose derivative is cellulose acetate hydrogen succinate and said support is a metal sheet.

20. A process for making a printing relief which comprises exposing to actinic light selected portions of the photosensitive layer of the photopolymerizable element defined in claim 13 until substantial addition polymerization to the insoluble state occurs in the exposed areas of said layer with substantially no polymerization in the unexposed portions of the layer and removing said latter portions by washing the exposed element with a solvent for the photosensitive layer.

21. A process as set forth in claim 20 wherein said exposure is through an image-containing element having actinic light-opaque areas and actinic light-transparent areas which latter are of the same optical density.

22. A printing relief obtainable by the process set forth in claim 21.

References Cited in the file of this patent

UNITED STATES PATENTS

| | | |
|---|---|---|
| 2,505,067 | Sachs et al. | Apr. 25, 1950 |
| 2,670,286 | Minsk et al. | Feb. 23, 1954 |
| 2,760,863 | Plambeck | Aug. 28, 1956 |

FOREIGN PATENTS

| | | |
|---|---|---|
| 717,708 | Great Britain | Nov. 3, 1954 |

OTHER REFERENCES

Stevens: Society of Chemical Industry Journal, London, vol. 64, 1945, pages 135–138.